S. J. WELCH.
DIRIGIBLE LAMP CONSTRUCTION.
APPLICATION FILED NOV. 18, 1916.

1,247,189.

Patented Nov. 20, 1917.
2 SHEETS—SHEET 1.

Inventor
Samuel J. Welch
By his Attorneys
Prindle Wright & Small

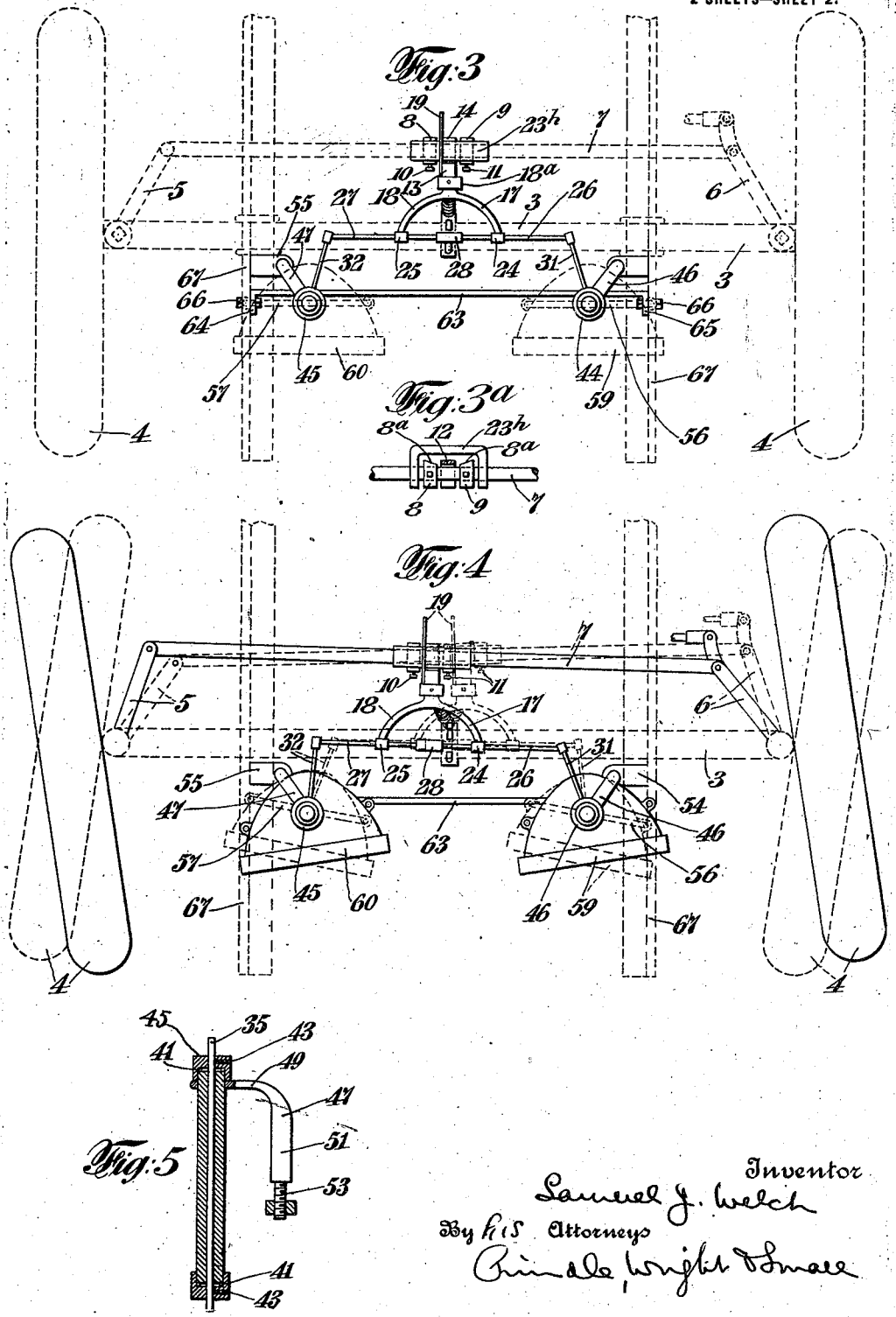

UNITED STATES PATENT OFFICE.

SAMUEL J. WELCH, OF TROY, PENNSYLVANIA.

DIRIGIBLE-LAMP CONSTRUCTION.

1,247,189.  Specification of Letters Patent.  Patented Nov. 20, 1917.

Application filed November 18, 1916. Serial No. 132,028.

*To all whom it may concern:*

Be it known that I, SAMUEL J. WELCH, of Troy, in the county of Bradford, and in the State of Pennsylvania, have invented a certain new and useful Improvement in Dirigible-Lamp Constructions, and do hereby declare that the following is a full, clear, and exact description thereof.

My invention relates to means for directing the light projecting means of vehicles, especially automobiles.

The object of my invention is to provide an apparatus of this kind so arranged that the part of the roadway in front of the automobile while going around curves may be illuminated, but so constructed that it may be thrown into and out of operation at any time when desired. A further object is to provide a controlling means for the same which is operable from the seat of the driver.

This application covers an improvement on my co-pending application upon dirigible lamp, Serial No. 81,592, filed March 2, 1916.

While my invention is capable of embodiment in many different forms for the purpose of illustration I have shown only one form thereof in the accompanying drawings, in which—

Fig. 3 is a plan view of the same, showing the parts in one position;

Figure 1:
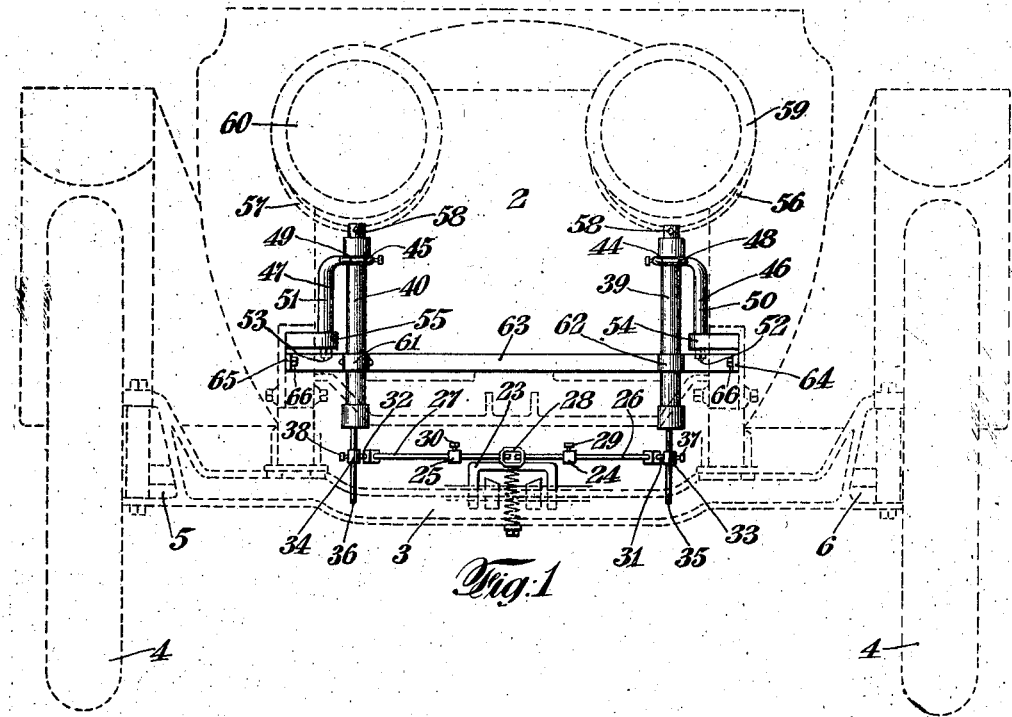
Figure 1 is a front elevation of an apparatus made in accordance with my invention.
Figure 2:
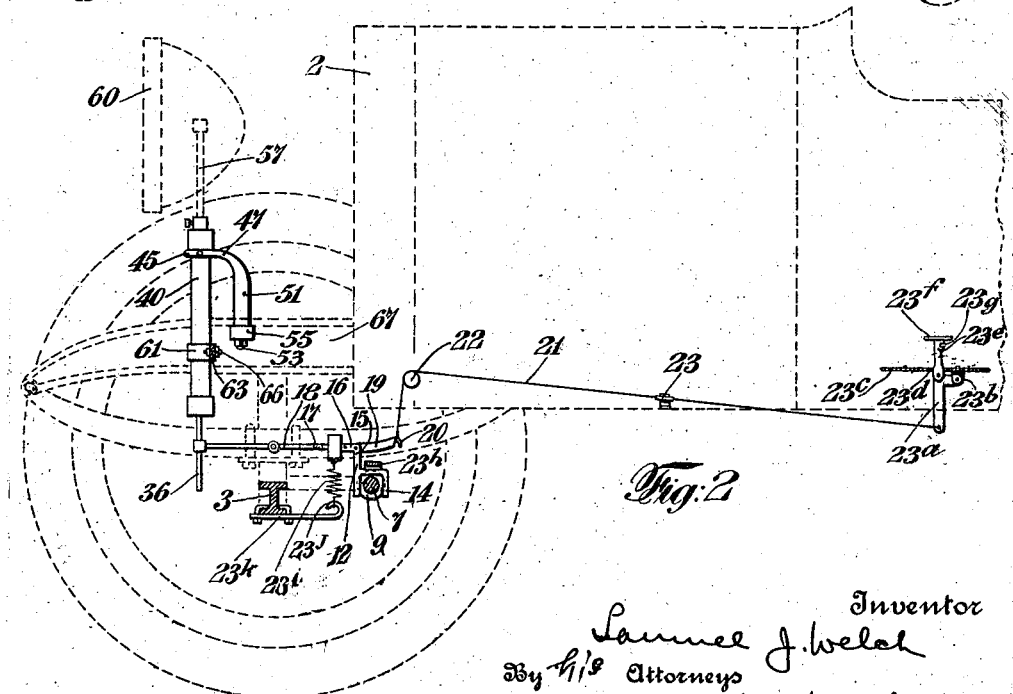
Fig. 2 is a longitudinal vertical section of the same.

Fig. 3ª is a detailed view of the form of connection used between steering rod and link of the apparatus;

Fig. 4 is a similar view showing the parts in another position; and

Fig. 5 is an enlarged vertical section of a detail.

In the drawings I have shown diagrammatically an automobile 1 having at the front thereof a radiator 2, a front axle 3, front wheels 4, levers 5 and 6 for guiding the front wheels, and a bar 7 connecting the levers 5 and 6 for the purpose of moving the same. Located on this bar 7 are two collars 8 and 9, having upper beveled surfaces 8ª, which are secured to said bar by set screws 10 and 11. Between the two collars 8 and 9 there is located a rear end 12 of a yoke 13. The rear end 12 of said yoke is provided with a bearing 14 which fits loosely over the bar 7 between the collars 8 and 9, and an upwardly directed portion 15 to enable the yoke to have ample clearance over the front axle 3, a forwardly directed portion 16 above said axle 3 and two arms 17 and 18. Attached to the forwardly directed portion 16 there is a bar 19 having a hook 20 which is connected to a cable 21 passing over a guide roller 22 secured to the frame of the automobile. From this point the cable 21 passes rearwardly through a guiding sleeve 23, also located on the frame of the automobile 2, and thence to a bell crank lever 23ª supported upon a bracket 23ᵇ attached to the underside of a platform 23ᶜ, which is the platform located immediately in front of the driver's seat. Said platform 23ᶜ has a slot 23ᵈ through which passes a plunger 23ᵉ having a plate 23ᶠ attached to the same for operation by the foot of the driver. Said plunger 23ᵉ, furthermore, has a slot 23ᵍ which is adapted to engage the platform 23ᶜ when depressed, and when the automatic moving means for the automobile lamps is to be thrown out of operation. Above the beveled collars 8ª there is located a yoke 23ʰ which is secured to the rod so as to limit the upward movement of the arm 13. To said forwardly directed portion 16 there is, furthermore, attached a spring 23ⁱ, the lower end of which is connected to a hook 23ʲ on a plate 23ᵏ secured by clamping bolts 23ˡ to the axle 3 of the automobile. The two arms 17 and 18 are provided respectively with sleeves 24 and 25 to receive respectively rods 26 and 27, which are connected together by a turnbuckle 28 arranged to move the two ends of the rods 26 and 27 together or away from each other, as desired, to adjust the angular positions of the lights to be thrown on the roadway as hereinafter described. Set screws 29 and 30 are provided in the sleeves 24 and 25 to securely fasten the rods 26 and 27 to the yoke 13. The rods 26 and 27 are at their other ends connected respectively to lever arms 31 and 32, the other ends of said levers having sleeves 33 and 34 to receive vertical rods 35 and 36. Set screws 37 and 38 securely fasten said rods 35 and 36 to the sleeves 33 and 34. The rods 35 and 36 pass upwardly through tubes 39 and 40 having ball bearings 41 on their ends, said ball bearings being equipped with caps 42 secured to the rods 35 and 36 by set screws 43. Around the tubes 39 and 40 are located sleeves 44 and 45 which are carried respectively by arms 46 and 47 having horizontal portions 48 and 49 and vertical portions 50 and 51, which are provided with lower screw-threaded ends 52 and 53, which pass through and are secured in lamp sockets 54 and 55 of the usual type provided on automobiles for holding lamps. At their upper ends the rods 35 and 36 are provided with yokes 56 and 57 held in place by set screws 58, said yokes 56 and 57 carrying lamps 59 and 60 in the usual way, and of any desired type that may be found useful in connection with the operation of vehicles. The tubes 39 and 40 are held in position by means of clamping straps 61 and 62, which pass through a bar 63 having offset portions 64 and 65 at its two ends, which are adapted to be fastened by bolts 66 to a forwardly directed frame 67, such as that usually found on automobiles.

In the operation of my invention, assuming that the apparatus is being operated by night, when it is desired to utilize the light from the lamps 59 and 60, the plunger 23ᵉ will be in its elevated position, that is to say, with the slot 23ᵍ disengaged from the platform 23ᶜ so that the spring 23ⁱ may pull the arm 13 into engagement with the rod 7. When now the car is driven forwardly on a straight road, the lights from the lamps 59 and 60 shine directly in front of the automobile, but when the car begins to make a turn, the lamps 59 and 60 turn to a corresponding degree, and thus throw their lights immediately on the part of the curved roadway which the car is to follow in its turning movement. At the same time, owing to the turning movement of the lamps 59 and 60, there is no longer any danger due to the throwing of the lights in the faces of the drivers of automobiles coming in the opposite direction around the curve. It will be noted that this operation of the lamps 59 and 60, so as to turn according to the extent of the turning movement of the car, is carried out entirely automatically, and without any special effort or additional motions on the part of the driver. On the other hand, when it is desired not to utilize the lamps 59 and 60, as for example, where the car is to be operated only in the day time for a considerable period, the turning movement of the lamps 59 and 60 can be discontinued by merely depressing the plunger 23ᵉ and causing the slot 23ᵍ to engage with the platform 23ᶜ, whereupon the bearing 14 will be lifted above the collars 8 and 9 so that the yoke 13 is no longer moved by the movement of the bar 7.

While I have described my invention above in detail, I wish it to be understood that many changes may be made therein without departing from the spirit of my invention.

I claim:

1. In combination, a vehicle having dirigible wheels, a vehicle lamp, means to turn the same with the turning of the vehicle, an adjustable means to disconnect the lamp-turning means, comprising a spring-pressed foot-operated device, and upper and lower guides for directing the parts into coöperation when being reconnected.

2. In combination, a vehicle having dirigible wheels, a vehicle lamp, means to turn the same with the turning of the vehicle, an adjustable means to disconnect the lamp-turning means, comprising a spring-pressed foot-operated device, located within reach of the driver's seat, and upper and lower guides for directing the parts into coöperation when being reconnected.

3. In an automobile, a pair of vehicle lamps, a rod connecting the same, a steering rod, a link connected to one of said rods and freely movable into and out of engagement with the other, and means operable from the driver's seat for moving said link into and out of operative position.

4. In an automobile, a pair of vehicle lamps, a rod connecting the same, a steering rod, a link connected to one of said rods and adjustably engaging the other, guiding members adjacent the engaging portion of said link to lead the same into proper operative position, and means operable from the driver's seat for moving said link into and out of operable position.

5. In an automobile, a steering rod, a link freely movable into and out of engagement with said rod, a lamp, means connected to said link for rotating said lamp, and means operable from the driver's seat for moving said link into and out of engagement with said steering rod.

6. In an automobile, a pair of vehicle lamps, a bar connecting the same, a steering rod, means normally connecting said bar to said rod for actuation by the latter and freely movable out of connection therewith, and means operable from the driver's seat to remove said connecting means from operative position.

7. In combination, a pair of vehicle lamps, a bar connecting the same, a steering rod, a link connected to said bar and having a portion freely movable into and out of engagement with said steering rod, a spring normally holding said link in engaging position, and means operable from the driver's seat to move said link out of such engaging position.

8. In an automobile, a steering rod, a link movable into and out of engagement therewith, a lamp, means connected to said link for rotating said lamp, means operable from the driver's seat for moving said link into and out of engagement with said steering rod, and members located upon said steering rod for guiding said link into engaging position with said rod.

In testimony that I claim the foregoing I have hereunto set my hand.

SAMUEL J. WELCH.

Witnesses:
S. F. ROSEBROOK,
F. I. DOLAWAY.